US008412556B2

(12) United States Patent
Wötzel et al.

(10) Patent No.: US 8,412,556 B2
(45) Date of Patent: Apr. 2, 2013

(54) SYSTEMS AND METHODS FOR FACILITATING AN ANALYSIS OF A BUSINESS PROJECT

(75) Inventors: Dagmar Wötzel, Assling (DE); Thomas Morus Erich Luethi, Münich (DE); Hans-Juergen Schloss, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 445 days.

(21) Appl. No.: 12/533,562

(22) Filed: Jul. 31, 2009

(65) Prior Publication Data
US 2010/0030614 A1 Feb. 4, 2010

Related U.S. Application Data

(60) Provisional application No. 61/137,599, filed on Jul. 31, 2008.

(51) Int. Cl.
*G06Q 10/00* (2012.01)
(52) U.S. Cl. .................................................. 705/7.28
(58) Field of Classification Search .................. 705/7.28
See application file for complete search history.

(56) References Cited

U.S. PATENT DOCUMENTS

| | | | |
|---|---|---|---|
| 6,938,068 B1 | 8/2005 | Kraft et al. | 709/203 |
| 7,051,036 B2* | 5/2006 | Rosnow et al. | 707/723 |
| 7,321,864 B1* | 1/2008 | Gendler | 705/7.15 |
| 7,359,866 B2 | 4/2008 | Farat | 705/14 |
| 7,548,883 B2* | 6/2009 | Lawrence | 705/38 |
| 7,668,776 B1* | 2/2010 | Ahles | 705/38 |
| 7,685,013 B2* | 3/2010 | Gendler | 705/7.23 |
| 7,853,468 B2* | 12/2010 | Callahan et al. | 705/7.28 |
| 2001/0027389 A1* | 10/2001 | Beverina et al. | 703/22 |
| 2002/0082882 A1 | 6/2002 | Perry et al. | 705/7 |
| 2002/0099578 A1 | 7/2002 | Eicher, Jr. et al. | 705/7 |
| 2003/0126049 A1 | 7/2003 | Nagan et al. | 705/35 |
| 2003/0135399 A1 | 7/2003 | Ahamparam et al. | 705/7 |
| 2004/0015376 A1* | 1/2004 | Zhu et al. | 705/7 |
| 2004/0128186 A1 | 7/2004 | Breslin et al. | 705/10 |
| 2004/0181665 A1 | 9/2004 | Houser | 713/158 |
| 2004/0193907 A1 | 9/2004 | Patanella | 713/200 |
| 2005/0021360 A1 | 1/2005 | Miller et al. | 705/1 |
| 2005/0071217 A1* | 3/2005 | Hoogs et al. | 705/10 |

(Continued)

OTHER PUBLICATIONS

David Baccarini, Richard Archer. "The risk ranking of projects: a methodology." International Journal of Project Management, vol. 19, Issue 3, Apr. 2001, pp. 139-145, ISSN 0263-7863, 10.1016/S0263-7863(99)00074-5.*

(Continued)

*Primary Examiner* — Peter Choi
*Assistant Examiner* — George H Walker
(74) *Attorney, Agent, or Firm* — King & Spalding L.L.P.

(57) ABSTRACT

Systems and methods for analyzing projects in a business entity including multiple groups and multiple levels of decision making authority are provided. Project identification data that identifies a particular project is received. A project categorization of the project is performed to categorize the project based on one or more of the size, general risks, and complexity of the project. An anti-corruption risk assessment of the project is performed to categorize an anti-corruption risk associated with the project. A group-specific risk assessment of the project is performed to categorize a risk associated with the project relevant to one of the multiple groups of the business entity. A limit of authority escalation level is automatically determined based at least on the results of (a) the project categorization, (b) the anti-corruption risk assessment, and (c) the group-specific risk assessment, wherein the limit of authority escalation level indicates a particular level of decision making authority of the business entity required to approve the project.

17 Claims, 19 Drawing Sheets

U.S. PATENT DOCUMENTS

| | | | |
|---|---|---|---|
| 2005/0114829 A1* | 5/2005 | Robin et al. | 717/101 |
| 2005/0131818 A1 | 6/2005 | Desal et al. | 705/40 |
| 2006/0020604 A1 | 1/2006 | Murez et al. | 707/100 |
| 2006/0259471 A1 | 11/2006 | Droubie et al. | 707/3 |
| 2006/0282291 A1 | 12/2006 | Runciman | 705/3 |
| 2007/0288355 A1 | 12/2007 | Roland et al. | 705/38 |
| 2008/0103804 A1* | 5/2008 | Latta et al. | 705/1 |
| 2008/0261645 A1 | 10/2008 | Luo et al. | 455/522 |
| 2008/0281734 A1 | 11/2008 | Longe et al. | 705/31 |
| 2009/0030751 A1 | 1/2009 | Barve et al. | 705/7 |
| 2009/0030763 A1 | 1/2009 | Purtell | 705/7 |
| 2009/0228337 A1 | 9/2009 | Swindon et al. | 705/10 |
| 2009/0248659 A1 | 10/2009 | Mccool et al. | 707/5 |
| 2009/0276381 A1 | 11/2009 | Boies et al. | 706/12 |

OTHER PUBLICATIONS

Daniel Baloi, Andrew D.F. Price, Modelling global risk factors affecting construction cost performance, International Journal of Project Management, vol. 21, Issue 4, May 2003, pp. 261-269, ISSN 0263-7863, 10.1016/S0263-7863(02)00017-0.*

Asian Development Bank. "Guidelines for Implementing ADB's Second Governance and Anticorruption Action Plan." May 200.*

Mario A. Aguilar, Jit B.S. Gill and Livio Pino. "Preventing Fraud and Corruption in World Bank Projects." The World Bank, May 2000.*

* cited by examiner

SALES INTERMEDIARIES ARE BUSINESS PARTNERS WHO SUPPORT ABC COMPANY DURING THE PROJECT (E.G., IN ACQUIRING NEW BUSINESS). THEIR INVOLVEMENT MAY PRESENT A HIGHER RISK FOR CORRUPTION AND THUS THEIR INVOLVEMENT IS SPECIFICALLY ASKED FOR

Sales Intermediary

[Add Sales Intermediary]

Name:* [    ]  Country:* [Afghanistan (AF) ▼]  Payment:* [fix ▼]  Provision (EUR or %): [    ]  [Delete]

Major Subcontractors (who are awarded more than X% of the ABC Company's order volume AND if this amount is higher than $Y

[Add Subcontractor]

Name:* [    ]  Country:* [Afghanistan (AF) ▼]  Subcontracted Offer Volume (EUR or %): [    ]  [Delete]

ABC Company Procurement involved to check compliance of subcontractor or only preferred subcontractors involved with standard contracts

[Back to List]   [▼] *   [Reset] [Save]

USER MAY ADD / DELETE ANY SALES INTERMEDIARY OR MAJOR SUBCONTRACTOR

MAJOR SUBCONTRACTORS WITH MORE THAN X% OF ABC COMPANY'S ORDER VOLUME AND MINIMUM $Y MAY PRESENT A SPECIAL RISK DUE TO THEIR STRONG INFLUENCE AND THUS ARE REQUIRED TO BE NAMED

FIG. 7A

|  | Level 1 | Level 2 |
|---|---|---|
| Financial | 30 | 95 |
| Order Value | up to EUR 2.5 mil. | up to EUR 2.5 mil. - EUR 30 mil. |
|  | 10 ☐ | 30 ☐ |
| Total Estimated Risk Volume | <1% of order value | 1-3% |
|  | 10 ☐ | 25 ☐ |
| Project Profit Gross Margin | >10% >20% | 5-10% 10-20% |
|  | 10 ☐ | 25 ☐ |
| Gross R&D/Engineering cost (EUR mil.) | up to 1% of order | 1 to 5% |
|  | 0 ☐ | 15 ☐ |
| Contractual | 15 | 75 |
| Contractual position in the project | Subcontractor | Sole supplier |
|  | 15 ☐ | 40 ☐ |
| External partners, bound by contract | None | One |
|  | 0 ☐ | 10 ☐ |
| Internal business entity partners (Number) | None | One |
|  | 0 ☐ | 10 ☐ |
| Customer/rep relationship/ Rating (known and cooperative?) | Customer known, very cooperative | Customer known, cooperative |
|  | 0 ☐ | 15 ☐ |
| Technical Complexity | 25 | 90 |
| Technical Complexity | very low | low |
|  | 10 ☐ | 30 ☐ |
| Clarity of Product/ Scope Definition | Very detailed | Detailed |
|  | 10 ☐ | 30 ☐ |
| New Technology Development | Of the shelf product | Almost Standard or duplicate of existing product |
|  | 5 ☐ | 30 ☐ |
| Organization Considerations | 15 | 15 |
| Type of project (supply, Syst,Turnkey) (keep but reconsider) | Component supply | Component supply with technical services |
|  | 15 ☐ | 40 ☐ |
| Contractual Complexity (Low through High) | very low | low |
|  | 0 ☐ | 30 ☐ |
| Strategic Significance for business entity group including potential future Sales | very low | low |
|  | 0 ☐ | 10 ☐ |
| Strategic relevance for the customer | very low | low |
|  | 0 ☐ | 10 ☐ |
|  | 85 | 350 |

TO FIG. 7B

| Category Limits |||
|---|---|---|
| A = > 1000 points | B = 500 to 1000 points | C = 60 to 500 points |
| D = 40 to 59 points | E = 20 to 39 points | F = < 20 points |

FIG. 7B

FROM FIG. 7A

| Level 3 | Level 4 | Level 5 | Value |
|---|---|---|---|
| 200 | 305 | 470 | 0 |
| EUR 30-EUR 100 mil. | EUR 100-EUR 300 mil. | over EUR 300 mil. | |
| 70 ☐ | 100 ☐ | 150 ☐ | 0 |
| 3-5% | 5-10% | >10% | |
| 45 ☐ | 70 ☐ | 100 ☐ | 0 |
| 2-5% | 0-2% | less than 0% | |
| 5-10% | 0-5% | less than 0% | |
| 45 ☐ | 70 ☐ | 120 ☐ | 0 |
| 5-10% | 10-20% | > 20% | |
| 40 ☐ | 65 ☐ | 100 ☐ | |
| 130 | 195 | 300 | 0 |
| Partner | JV or Consort. Member | Consort.leader/Gen Contractor | |
| 60 ☐ | 75 ☐ | 100 ☐ | 0 |
| Two to Three | Four to Five | > Five | |
| 30 ☐ | 45 ☐ | 70 ☐ | 0 |
| Two to Three | Four to Five | > Five | |
| 20 ☐ | 20 ☐ | 50 ☐ | 0 |
| Customer known, neutral | Customer not known | Customer known, uncooperative | |
| 20 ☐ | 45 ☐ | 80 ☐ | 0 |
| 205 | 285 | 420 | 0 |
| medium | high | very high | |
| 70 ☐ | 100 ☐ | 150 ☐ | 0 |
| General Specification | Very General Specification | Only Basic concept/requirements | |
| 65 ☐ | 85 ☐ | 120 ☐ | 0 |
| Duplicate with significant modifications | New Development from existing components | New Development | |
| 70 ☐ | 100 ☐ | 150 ☐ | 0 |
| 140 | 215 | 320 | 0 |
| System and Solution Supply | Turnkey System | Turnkey with ongoing operation main commitment/or ownership | |
| 60 ☐ | 85 ☐ | 120 ☐ | 15 |
| medium | high | very high | |
| 50 ☐ | 70 ☐ | 100 ☐ | 0 |
| medium | high | very high | |
| 15 ☐ | 30 ☐ | 50 ☐ | 0 |
| medium | high | very high | |
| 15 ☐ | 30 ☐ | 50 ☐ | 0 |

| Category Limits | | |
|---|---|---|
| A = > 1000 points | B = 500 to 1000 points | C = 60 to 500 points |
| D = 40 to 59 points | E = 20 + 39 points | F = < 20 points |

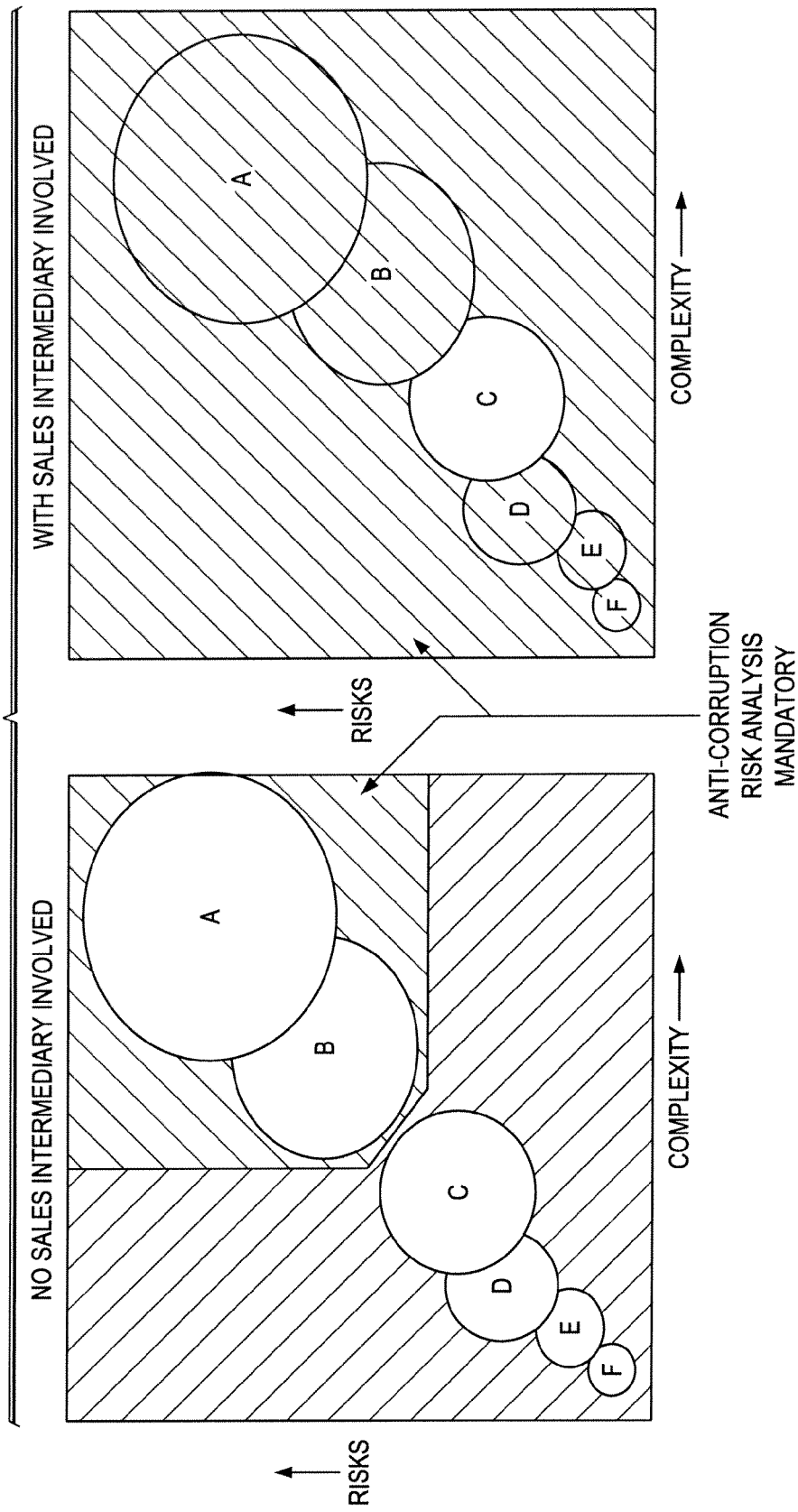

FIG. 10

| 1 Risk Classifiers | | | |
|---|---|---|---|
| Ref | Question/Guideline | Risk | Answer/Comment |
| A | Is the tender being prepared in conjunction with one or more business partners? | ⚠ | ○ yes ◉ no |
| B | Is the tender defined as Government Business? | ⚠ | ○ yes ◉ no  If yes; please provide a brief description of the benefit. |
| C | Is the customer located in a country that has a current TI/CPI rating of less than 6.4? | ⚠ | ◉ 6.4 - 10.0 (lowest risk)<br>○ 3.4 - 6.3 (medium risk)<br>○ 0.0 - 3.3 (highest risk)<br>If less than 6.4; please insert the name of the country and the TI-rating. |
| D | As a result of an Internet search, are you aware of any concerns around the integrity of the customer? | ⚠ | ◉ No concerns based on Internet search<br>○ Internet search results indicate suspicions<br>○ Internet search results indicate proven integrity issues<br>If suspicion of or proven integrity issues please provide a brief description of the concern. |
| E | Has a government official or a customer employee been given, offered, or promised the giving of anything of value, directly or indirectly? | ⚠ | ○ yes ◉ no  If yes; please provide a brief description of the benefit. |

FIG. 11

| 2 Business Partner Risk | | | |
|---|---|---|---|
| Ref | Question/Guideline | Risk | Answer/Comment |
| 2.1. | Follow up questions for risk qualifier A<br><br>Is the tender being prepared in conjunction with business consultant(s)? | ⊖ | ⦿ yes ○ no  If yes; please insert name of the business consultant(s). |
| 2.1.a | Has due diligence of the business consultant been conducted and approved as described in the business rules? | ⊖ | ⦿ green - Due diligence fully performed and approved in accordance with business rules.<br>○ yellow - Due diligence performed but not fully in accordance with business rules.<br>○ red - No due diligence performed.<br>If green or yellow, please make reference to supporting documentation. |
| 2.1.b | Has the Business Consultant Agreement been conducted and approved in accordance with the business rules? | ⊖ | ○ green - Business Consultant Agreement entered into that is in accordance with business rules.<br>⦿ yellow - Business Consultant Agreement entered into that is not fully in accordance with business rules.<br>○ red - The Business Consultant Agreement does not include any anti-bribery provisions, or includes inadequate clauses.<br>If green or yellow, please make reference to supporting documentation. |
| 2.1.c | Are any payments made to the business consultant in relation to this tender? | ⊖ | ○ yes ⦿ no |

FIG. 12

| 3 Customer Risk | | | |
|---|---|---|---|
| Ref | Question/Guideline | Risk | Answer/Comment |
| | Follow up questions for at least all project categories A and B, and C projects with business partners | | |
| 3.1.a | Has business entity performed and documented an integrity background check on the customer? | ⊖ | ⦿ green - An integrity background check has been performed and documented that covers all of the areas outlined in the guidance.<br>○ yellow - An integrity background check has been performed and documented that covers some of the areas outlined in the guidance.<br>○ red - No integrity background check has been performed and documented.<br>If green or yellow, please make reference to supporting documentation. |
| 3.1.b | Has a compliance officer, Legal Services or contract management reviewed the terms of the contract with the customer for unusual or vague payment, billing or discount terms, or any other clause that may cause a violation of anti-bribery legislation? | ⊖ | ○ green - A compliance officer, Legal Services or contract management reviews the terms of the contract with the customer.<br>⦿ yellow - the terms of the contract with the customer are reviewed but not by a compliance officer, Legal Services or contract management.<br>○ red - No review performed at all.<br>If green or yellow, please make reference to supporting documentation. |
| 3.1.c | Are the reasonableness or appropriateness of all costs incurred in relation to the tender-budget reviewed by a function independent from the bid-management? | ⊖ | ○ green - All costs are reviewed by a function independent from the bid-management.<br>○ yellow - All costs are reviewed but not by a function independent from the bid-management.<br>⦿ red - All costs are not reviewed.<br>If green or yellow, please make reference to supporting documentation. |

FIG. 15

| Quality Gate in preparation: | Bid approval or before LoA-Meeting |
|---|---|
| Overall progress to complete LoA assessment: | ☑ completed |
| 1  Project categorization:<br>   Category:  C | ☑ completed |
| 2  Anti-Corruption Risk Assessment:<br>   AC Risk Class:  3<br>   Risk Mitigation Level: ■□□ | ☑ completed |
| 3  Group LoA Risk Classification:<br>   Group Risk Class:  2 | ☑ completed |
| LoA escalation level:<br>(According to ABC Company's minimum standard. Please refer to group/region-specific regulations.) | Sub Division |
| Authorized Project Manager: | Sign Off    Summary Report |

PM / PM and CO need to sign it off prior to the LoA meeting

LoA Risk Report will be automatically created and is mandatory part of LoA meeting

FIG. 16

LoA Risk Report

GENERAL PROJECT INFORMATION

Project Key Data:
- Customer: My Test Customer
- Project name: Test Case Team
- Customer Country: Germany
- Other Ref. No.: My Tender Number
- Order Value: 21000 T-EUR
- Group: CIE
- ARC: 2000 (ABC Company)
- Milestone: PM040 Bid approved (PM040) or before LoA_Meeting

OVERVIEW ON SALES PARTNERS AND THEIR PROVISION

Business Partners:

Sales Intermediaries Involved:

| Name, Country: | Payment | Provision (EUR/%) |
|---|---|---|
| Sales Intermediary 1, DE | | 15,000 |

Major Subcontractors (having more than 20% or more than 1 million Euro of the project volume)

| Name, Country: | Subcontracted offer volume (EUR/%) | Procurement Involved |
|---|---|---|

No Major Subcontractors Involved.

CATEGORY AND RISK CLASSES AND ESCALATION LEVEL

LoA Assessment Results:
- Project Category: C
- Anti-Corruption Risk Class: 3
- Highest Group Risk Class: 2
- 105 Points
- LoA escalation level: Sub Division

WHO AND WHEN WAS THE REPORT SIGNED OFF?

Released by:
- Authorized PM: James Smith, 07.11.2007 13:20:29
- Authorized CO: Default Compliance Officer, 07.11.2007 13:23:05
- Group/Regional Compliance Office (without signature): Default Compliance Officer

ANTI-CORRUPTION ASSESSMENT RESULT BY TRAFFIC LIGHTS IN 6 CATEGORIES

Anti-Corruption Risk Assessment Results:

| Customer | Business Consultants | Joint Ventures | Consortium | Service Agent | Distributor |
|---|---|---|---|---|---|
| green | green | green | green | green | green |

FIG. 17

| Color | Control Exception | Implication | Compliance Officers Recommendations |
|---|---|---|---|
| red | Legal advice has not been obtained in respect of applicable anti-bribery and corruption legislation in the country in which the customer is located. | If local legal advice regarding country-specific anti-bribery and corruption legislation is not obtained, then there is a risk the the business entity may inadvertently violate this legislation. Legal advice is particularly important where the customer is located in a country which you are unfamiliar with.<br><br>Obtaining this legal advice will help assure that the proper precautions are considered and taken with regard to the business entity's obligations on local anti-bribery and corruption legislation and are integrated into the tender bid process. | |

REASONS FOR RED OR YELLOW

ROOM FOR COMPLIANCE OFFICER'S RECOMMENDATION (WRITTEN NOTES IN LoA MEETING)

FIG. 18

Authorized Project Manager:

Proceed to next Quality Gate after successful LoA Meeting: [Confirmed in LoA Meeting]

[Withdraw Signature]

| History | | | | | |
|---|---|---|---|---|---|
| Quality Gate | LoA Assessment | Role | User | Date | Action |
| PM040 | C / 3 ■□□ / 2 | Authorized Project Manager | sue.smith@abccompany.com | 2007-11-13 17:01:57.0 | SIGN |
| | | Authorized Compliance Officer | default.co | 2007-11-13 17:02:39.0 | SIGN |

[LoA Risk Report]

SYSTEMS AND METHODS FOR FACILITATING AN ANALYSIS OF A BUSINESS PROJECT

CROSS-REFERENCE TO RELATED APPLICATIONS

This application claims the benefit of U.S. Provisional Application No. 61/137,599 filed on Jul. 31, 2008, entitled "LIMITS OF AUTHORITY TOOL (LoA)", which is incorporated herein in its entirety.

TECHNICAL FIELD

The present disclosure relates generally to the field of analyzing business projects, including performing risk analyses of various business projects.

BACKGROUND

As businesses entities become larger and more complex, coupled with the rise of globalization and complex international business relationships, particular risks associated with business deals, such as the risks of bribery or corruption by another party in a deal, remain a substantial concern. Current systems for analyzing and managing such risks are typically ad hoc and non-uniform across a business entity and over time. In addition, typical systems do not provide a consistent or efficient process for presenting approval decisions for proposed business deals to appropriate decision levels within a business, for example, based on the risks associated with such proposed business deals.

SUMMARY

In some embodiments of the present disclosure, a method for analyzing projects in a business entity including multiple groups and multiple levels of decision making authority is provided. Project identification data is received that identifies a particular project. A project categorization of the project is performed to categorize the project based on one or more of the size, general risks, and complexity of the project. An anti-corruption risk assessment of the project is performed to categorize an anti-corruption risk associated with the project. A group-specific risk assessment of the project is performed to categorize a risk associated with the project relevant to one of the multiple groups of the business entity. A limit of authority escalation level is automatically determined based at least on the results of (a) the project categorization, (b) the anti-corruption risk assessment, and (c) the group-specific risk assessment, wherein the limit of authority escalation level indicates a particular level of decision making authority of the business entity required to approve the project.

In some embodiments of the present disclosure, logic instructions stored in computer-readable media and executable by a processor for analyzing projects in a business entity including multiple groups and multiple levels of decision making authority are provided. The logic instructions include instructions for: receiving from a user project identification data that identifies a particular project; facilitating a project categorization of the project to categorize the project based on one or more of the size, general risks, and complexity of the project; facilitating an anti-corruption risk assessment of the project to categorize an anti-corruption risk associated with the project; receiving a group-specific risk classification indicating a risk associated with the project relevant to one of the multiple groups of the business entity; and automatically determining a limit of authority escalation level based at least on the results of (a) the project categorization, (b) the anti-corruption risk assessment, and (c) the group-specific risk assessment, wherein the limit of authority escalation level indicates a particular level of decision making authority of the business entity required to approve the project.

In some embodiments of the present disclosure, a computer-implemented method for analyzing projects in a business entity including multiple groups and multiple levels of decision making authority is provided. The method includes receiving project identification data regarding a project from a user; presenting a set of questions regarding the project to the user via a display; receiving responses to the set of questions from the user; automatically categorizing the project based at least on the user's responses to the questions; automatically determining a set of risk assessment questions based on at least one of (a) the project identification data received from the user and (b) the automatic categorization of the project; presenting the risk assessment questions to the user via the display; receiving responses to the risk assessment questions from the user; automatically determining a risk class for the project based at least on the user's responses to the risk assessment questions; and automatically determining a limit of authority escalation level based at least on (a) the automatic categorization of the project and (b) the determined risk class for the project.

BRIEF DESCRIPTION OF THE DRAWINGS

Some embodiments of the disclosure may be understood by referring, in part, to the following description and the accompanying drawings wherein:

FIG. 3 illustrates an example interface generated by the limit of authority tool allowing the user to search for an existing project, according to certain embodiments;

FIGS. 4 and 5 illustrate example interfaces generated by the limit of authority tool allowing the user to enter key data regarding a project to be analyzed, according to certain embodiments;

FIGS. 7A and 7B illustrate an example project categorization questionnaire presented by the limit of authority tool, according to certain embodiments;

FIG. 9 illustrates a determination of whether an anti-corruption risk class analysis can be bypassed, according to certain embodiments;

FIG. 10 illustrates an example set of risk classifier questions presented by the limit of authority tool for determining an anti-corruption risk class, according to certain embodiments;

FIGS. 11 and 12 illustrate example anti-corruption risk mitigation level questions presented by the limit of authority tool, according to certain embodiments;

FIG. 15 illustrates an example summary page generated by a reporting engine of the limit of authority tool, according to certain embodiments;

FIG. 16 illustrates an example summary report generated by the reporting engine of the limit of authority tool, according to certain embodiments;

FIG. 17 illustrates an example process control report generated by the reporting engine of the limit of authority tool, according to certain embodiments; and FIG. 18 illustrates an example project history log maintained by the limit of authority tool, according to certain embodiments.

DETAILED DESCRIPTION OF THE DRAWINGS

Figure 1:
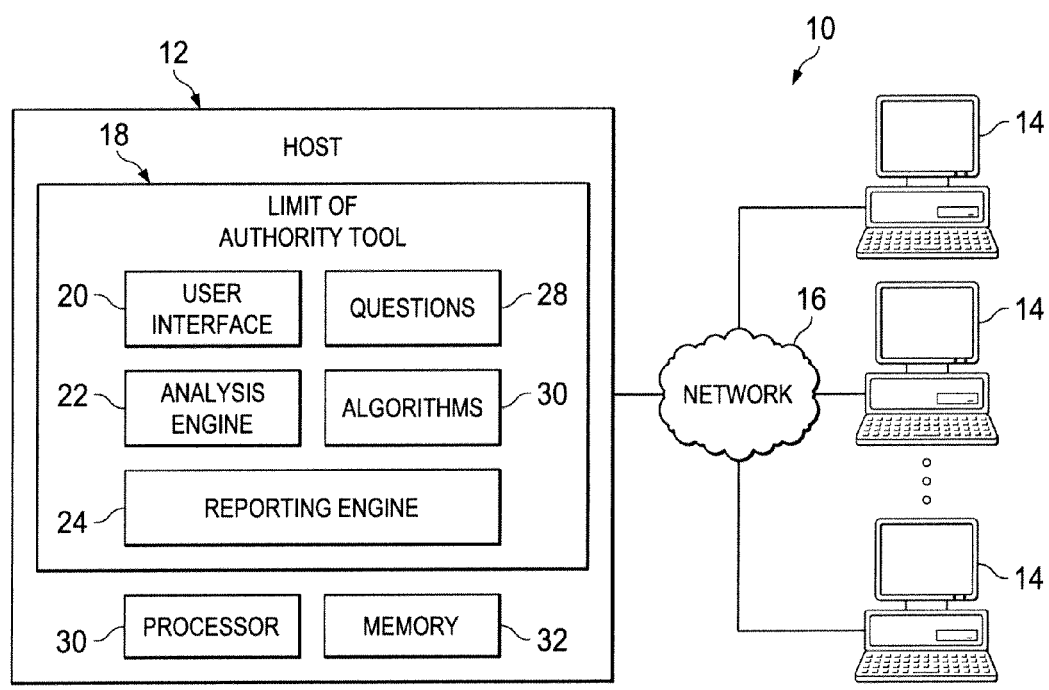
FIG. 1 illustrates a system for facilitating project approval decisions for a business entity, in accordance with certain embodiments of the invention.

Selected embodiments of the disclosure may be understood by reference, in part, to FIGS. 1-18, wherein like numbers refer to same and like parts. The present disclosure is broadly concerned with systems and methods for facilitating the process for making approval decisions for projects in a business environment (e.g., decisions regarding the acquisition of projects and/or submission of bids). In some embodiments, a "limit of authority" process is used to limit the authority to make such approval decisions to specific levels of decision making authority in a business, such as specific management levels in a business management hierarchy. The limit of authority process may improve the quality of decisions by escalating each decision to an appropriate level of decision making authority.

In some embodiments, the limit of authority process for a project includes a business entity performing multiple different categorizations/risk analyses of the project, and determining a limit of authority escalation level based on the results of the multiple different categorizations/risk classes. The limit of authority escalation level indicates a particular level of decision making authority of the business entity required to approve the project. The limit of authority escalation level may be determined based on the highest of the multiple different categorizations/risk classes of the project.

For example, the limit of authority process may include (a) performing a project categorization of the project to categorize the project based on one or more of the size, complexity, and general risk of the project, (b) performing an anti-corruption risk assessment of the project to categorize an anti-corruption risk associated with the project, and (c) performing a group-specific risk assessment of the project to categorize a risk associated with the project relevant to a specific group of the business entity. In some embodiments, the project categorization (a) and the group-specific risk assessment (c) are mandatory, while the anti-corruption risk assessment (b) is mandatory only in certain situations (e.g., based on the results of the project categorization and/or the presence of a business partner), and otherwise optional to the user. In other embodiments, all three steps (a)-(c) are required.

The limit of authority escalation level may be automatically determined by applying an algorithm or decision matrix to the results of (a) the project categorization, (b) the anti-corruption risk assessment (optional in some embodiments/situations), and (c) the group-specific risk assessment. For example, the limit of authority escalation level may be automatically determined based on the highest of the three categorizations/assessments. The project may then be presented to the appropriate level of decision making authority, which may then review the project for approval. If that level of decision making authority is unable to agree on the approval decision, the decision may be further escalated to the next higher level of decision making authority.

In some embodiments, a limit of authority tool is provided to facilitate the limit of authority process. The limit of authority tool may comprise a software application accessible to particular users associated with a business entity, such as a project manager and a compliance officer, for example. The limit of authority tool may provide a user interface for the user to enter various data, an analysis engine to process the entered data to determine various categorizations of a project and a limit of authority escalation level for the project, and a reporting engine for reporting the results of such analyses.

In an example scenario, a user (e.g., project manager or compliance officer) may enter various data, via the user interface of the limit of authority tool, to identify a particular project to be analyzed, as well as data identifying one or more users authorized to interact with the tool for various stages of the analysis. The limit of authority tool may then guide the user through the various stages of the analysis process, e.g.:

(i) a project key data entry stage in which the user enters various "project key data" regarding the project;

(ii) an authorized approver stage to determine authorized approvers for signing off on the results of the analysis;

(iii) a project categorization stage to categorize the project based on one or more of the size, general risks, and complexity of the project;

(iv) an anti-corruption risk assessment stage to categorize an anti-corruption risk associated with the project; and (v) a group-specific risk categorization stage to categorize a risk associated with the project relevant to one of the multiple groups of the business entity. In each stage, the limit of authority tool may prompt the user for various data.

In the project categorization stage, the tool may prompt the user to answer a questionnaire regarding the project's volume, complexity, and general business risk. The tool's analysis engine may calculate a score based on the user's answer, and determine a corresponding categorization (e.g., A, B, C, D, E, or F, where A indicates the largest/most complex/highest risk) of the project based on the score.

The anti-corruption risk assessment stage may include two parts: an anti-corruption (AC) risk class assessment, and a risk mitigation level assessment. In the anti-corruption risk class assessment, the tool may prompt the user to answer a questionnaire. The tool may select a particular questionnaire, or particular questions of the questionnaire, based on (a) "project key data" entered by the user and/or (b) the determined project categorization (e.g., A, B, C, D, E, or F). The tool's analysis engine may calculate an AC risk class (e.g., 0, 1, 2, or 3, where 0 indicates the highest risk) based on the user's answers to the questionnaire. In the risk mitigation level assessment, the tool may prompt the user to answer a number of "process control" questions selected based on the user's answers to the AC risk class questionnaire. The tool's analysis engine may calculate a risk mitigation level (e.g., red, yellow, or green) based on the user's answers to the process control questions. In some embodiments, the risk mitigation level is not included in the calculation of the limit of authority escalation level, but is presented to the decision making authority identified by the limit of authority escalation level. The risk mitigation level may thus give the decision making authority an indication of any areas of non-compliance or potential non-compliance with a defined risk assessment process.

In the group-specific (or "business-specific") risk assessment stage, the tool may prompt the user for a business group-specific risk classification (e.g., 0, 1, 2, or 3, where 0 indicates the highest risk) of the project based on the project's volume, complexity, and business risk. In some embodiments, the group-specific risk classification is determined outside of the tool (e.g., by a meeting of relevant persons), and the resulting classification (e.g., 0, 1, 2, or 3) is entered into the tool by the user.

After collecting all of this data from the user, the tool's analysis engine may determine an appropriate limit of authority escalation level based at least on the results of (a) the project categorization, (b) the anti-corruption risk assessment, and (c) the group-specific risk assessment. In some embodiments, the analysis engine may apply an algorithm or decision matrix to the project categorization (e.g., A, B, C, D, E, or F), the AC risk class (e.g., 0, 1, 2, or 3), and the group-specific risk classification (e.g., 0, 1, 2, or 3). The algorithm or decision matrix may essentially select the limit of authority escalation level based on the highest of the three classifications. As discussed above, the limit of authority escalation level indicates a particular level of decision making authority of the business entity required to approve the project. For example, in a business entity group, the limit of authority escalation level may identify a subdivision, a division, or the board as the proper level of decision making authority. As another example, in a business entity region, the limit of authority escalation level may identify a division, a group, or a regional board as the proper level of decision making authority. As another example, the limit of authority escalation level may identify a particular person or position, e.g., a Business Unit Manager, Business Unit CEO, Division CEO, or Sector CEO.

The tool's reporting engine may then report (e.g., by display or printed report) the results of such analyses. For example, the reporting engine may report the project categorization, the AC risk class, the risk mitigation level, the group risk class, and the resulting escalation level for the project. The reporting engine may also generate a summary page for "sign off" by an authorized approver (e.g., the project manager or compliance office identified at the beginning of the process). The reporting engine may also generate a summary report including information such as general project information, an overview on business/sales partners and their provision, the determined categories, risk classes, and escalation level, the identity of the user who signed off on the report, and a summary of anti-corruption assessment results for each of various parties to the project.

FIG. 1 illustrates a system 10 for facilitating project approval decisions for a business entity, in accordance with certain embodiments of the invention. System 10 includes a host 12 communicatively connected to a number of user terminals 14 by a network 16. Host 12 may comprise any type of computer system operable to host a limit of authority tool 18. In certain embodiments, host 12 may be a server. In another embodiment, host 12 may be a personal computer. In some embodiments, limit of authority tool 18 may be hosted by a particular user terminal 14, or an instance of limit of authority tool 18 may be hosted by each user terminal 14.

As depicted in FIG. 1, host 12 may include a processor 30, memory 32 communicatively coupled to processor 30, and any other suitable components for executing limit of authority tool 18.

Processor 30 may comprise any system, device, or apparatus operable to interpret and/or execute program instructions and/or process data associated with limit of authority tool 18, and may include, without limitation, a microprocessor, microcontroller, digital signal processor (DSP), application specific integrated circuit (ASIC), or any other digital or analog circuitry configured to interpret and/or execute program instructions and/or process data associated with limit of authority tool 18. In some embodiments, processor 30 may interpret and/or execute program instructions and/or process data stored in memory 32 and/or another component of host 12.

Memory 32 may be communicatively coupled to processor 30 and may include any computer-readable media suitable for storing any data or logic associated with limit of authority tool 18. For example, memory 32 may include computer-readable media for storing data and logic instructions associated with user interface 20, analysis engine 22, reporting ending 24, questions 28, and algorithms 30 of limit of authority tool 18. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; and/or any combination of the foregoing.

Each user terminal 14 may include any type of computer suitable for interacting with limit of authority tool 18, e.g., a personal computer, a laptop, a PDA, etc. Each terminal 14 may include any suitable hardware for interacting with limit of authority tool 18 e.g., processors, memory, software, and input and output (I/O) devices (e.g., a keyboard, a mouse, and a video display).

In some embodiments, limit of authority tool 18 is hosted locally by one or more user terminals 14, allowing directly access to tool 18. In some embodiments, limit of authority tool 18 is hosted by host 12 and accessible at each user terminal 14 via network 16. Thus, each terminal 14 may include a browser application for accessing limit of authority tool 18 via network 16 (e.g., an intranet or the Internet). In other embodiments, limit of authority tool 18 is hosted locally by one or more user terminals 14, allowing directly access to tool 18.

Network 16 may be a network and/or fabric configured to couple host 12 to target device 120. Network 16 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data) between host 12 and user terminals 14. Network 16 may transmit data using wireless transmissions and/or wire-line transmissions via any storage and/or communication protocol. Network 16 and its various components may be implemented using hardware, software, or any combination thereof. In some embodiments, network 16 allows user terminals 14 to access limit of authority tool 18 via an intranet, such as a company-wide intranet. In other embodiments, network 16 allows user terminals 14 to access limit of authority tool 18 via the Internet.

Limit of authority tool 18 is generally operable to facilitate the limit of authority process discussed herein. Limit of authority tool 18 includes a user interface 20, an analysis engine 22, a reporting engine 26, questions 28, and algorithms 30.

User interface 20 is generally configured to allow a user to interact with tool 18. User interface 20 may comprise any instrumentality or aggregation of instrumentalities by which a user may interact with tool 18. For example, user interface 20 may include a series of web pages or screens providing data to a user at user terminal 14, prompting the user for data, and providing interfaces (e.g., text fields, menus, check boxes, etc.) allowing the user to enter data with an input device (e.g., a keyboard or pointing device).

Analysis engine 22 is generally configured to analyze and process data entered by user(s) at user terminal(s) 14, e.g., to perform various categorizations/assessments of the project, select particular questions or other prompts to present the user, and determine a limit of authority escalation level for a project. Limit of authority tool 18 may maintain a set of questions 28 and one or more algorithms 30. Analysis engine 22 may select particular questions 28 to present to the user via user interface 20, e.g., based on previous data entered by the user. For example, as discussed below, analysis engine 22 may select one or more particular anti-corruption risk questions based on particular "project key data" entered by the user and/or the project categorization determined by tool 18 (based on the user's answers to a project size/complexity/risk questionnaire). As another example, as discussed below, based on the user's answers to a set of anti-corruption risk questions, analysis engine 22 may select one or more particular process control questions in order to determine an anti-corruption risk mitigation level.

Analysis engine 22 may access algorithms 30 for performing various analyses. For example, algorithms 30 may define rules for determining a project categorization, an anti-corruption risk class, and an anti-corruption risk mitigation level based on user answers to various questionnaires presented by tool 18, as well as an algorithm (e.g., a decision matrix) for determining a limit of authority escalation level for a project based on multiple different categorizations/assessments of the project.

Reporting engine 26 is generally configured to report (e.g., by display or printout at user terminal 14) the results of analysis engine 22. For example, reporting engine 26 may generate a report summarizing each of the categorizations/assessments of the project, as well the resulting escalation level for the project (see, e.g., FIG. 13). Reporting engine 26 may also generate a summary page for "sign off" by an authorized approver (e.g., the project manager or compliance office identified at the beginning of the process) (see, e.g., FIG. 14). Reporting engine 26 may also generate a risk report including information such as general project information, an overview on business/sales partners and their provision, the determined categories, risk classes, and escalation level, the identity of the user who signed off on the report, and a summary of anti-corruption assessment results for each of various parties to the project (see, e.g., FIG. 15). Reporting engine 26 may also generate a detailed report of particular areas of non-compliance with a risk assessment process (see, e.g., FIG. 16).

Figure 2:
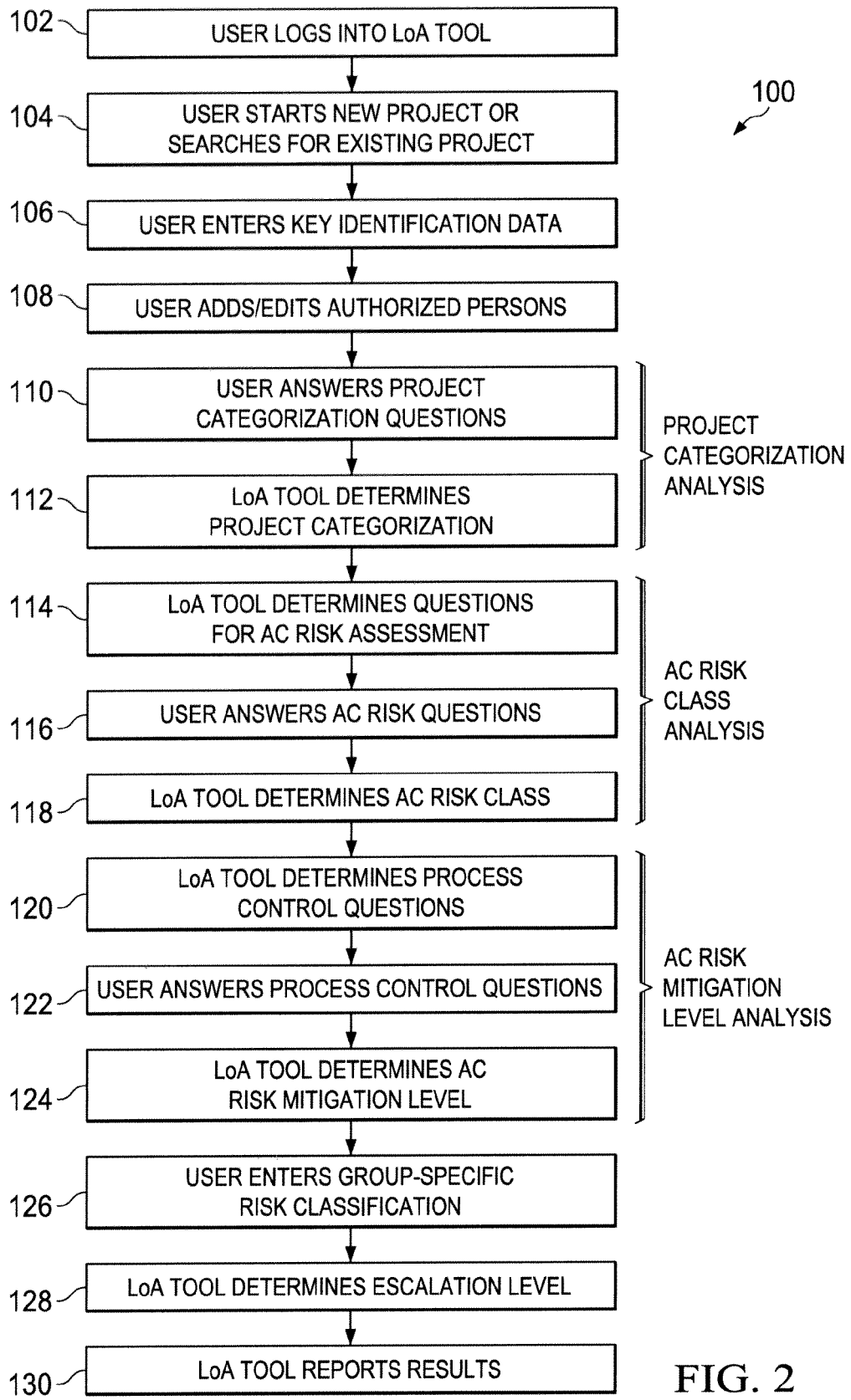
FIG. 2 illustrates an example method of using a limit of authority tool for analyzing a project for a business entity, according to certain embodiments of the invention.

FIG. 2 illustrates an example method 100 of using limit of authority tool 18 for analyzing a project for a business entity, ABC Company, to determine a limit of authority escalation level for the project, according to certain embodiments of the invention. The description of method 100 below is supported by references to FIGS. 3-17.

At step 102, a user at a user terminal 14 accesses a login screen of limit of authority tool 18, e.g., via an intranet or the Internet. Tool 18 may allow the user to login in tool 18 in various manners, e.g., by entering a username/email address and password, or by linking to a PKI digital certificate for the user. In some embodiments, every employee of ABC Company has at least one of a username/email address and password, or a PKI digital certificate, such that every employee can access tool 18. In other embodiments, only authorized approvers of ABC Company (e.g., employees with particular titles) have a username/email address and password, or a PKI digital certificate, such that only the authorized approvers can access tool 18.

Figure 3:
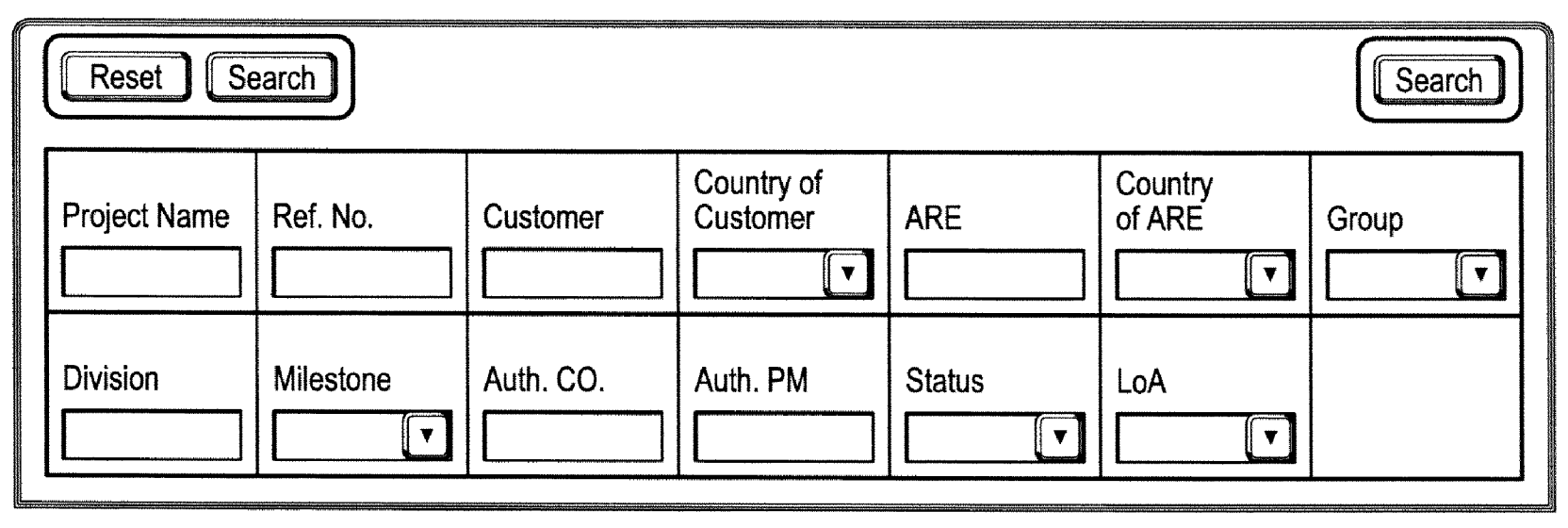

At step 104, after the user has successfully logged into tool 18, tool 18 prompts the user to start a new project or search for an existing project. If the user selects to search for an existing project, tool 18 may provide any suitable menus or search means for searching for an existing project (e.g., by project name, project reference number, customer, date range, etc.). FIG. 3 illustrates an example partial screen view generated by tool 18 allowing the user to search for an existing project. Alternatively, if the user selects to start a new project, tool 18 prompts the user to enter basic data, such as a project name, project reference number, customer name, project value, etc.

Figure 4:
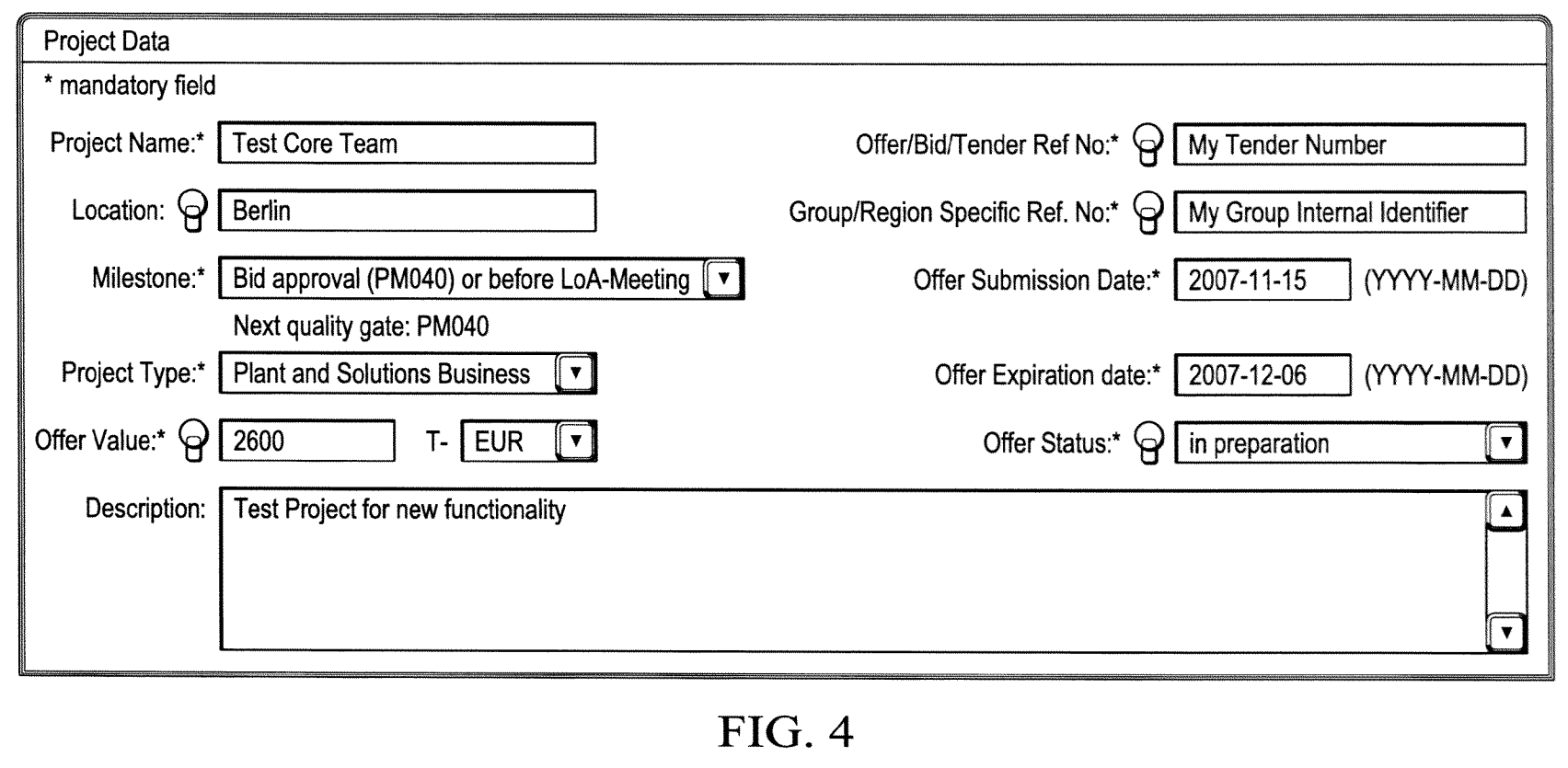

Next, at step 106, after identifying an existing project or entering the basic data for a new project, tool 18 prompts the user to enter "project key data" regarding the project. FIGS. 4 and 5 illustrates example partial screen views generated by tool 18 that prompts the user for an example set of project key data. As shown in FIG. 4, tool 18 may prompt the user for "project name," "project location," "milestone data," "project type," "offer value and currency," "project description," "offer/bid/tender reference number," "group/region specific reference number," "offer submission date," "offer expiry date," "and offer status." The "offer/bid/tender reference number" may identify the customer's tender number or an internal identifier of ABC Company. The "group/region specific reference number" may be used to identify the project if the project is downloaded and uploaded into a group/region system.

As shown in FIG. 5, tool 18 may prompt the user for data regarding entities that may add additional aspects of risk to the project, e.g., "business partners" and "major subcontractors." A "business partner" may be defined as a business entity that supports ABC Company during the project (e.g., acquiring a new business). Their involvement may present a higher risk for corruption, and thus tool 18 requests data regarding such business partners and their involvement in the project. A "major subcontractor" may be defined as subcontractor with more than X% of the bid value for the project and which amounts to a minimum monetary amount Y (where X and Y may be predefined by ABC Company). Such subcontractor may present a special risk due to their relatively strong influence, and thus tool 18 requests data regarding major subcontractors.

Next, at step 108, tool 18 automatically determines one or more "authorized approvers" (or at least default "authorized approvers") and/or prompts the user to add or edit "authorized approvers." An "authorized approver" is defined as a person authorized to sign off on one or more aspects of the project analysis performed by tool 18, e.g., results (reports or summaries) generated by reporting engine 24. Such authorized approvers may include, e.g., a project manager and/or one or more compliance officers.

Figure 6:
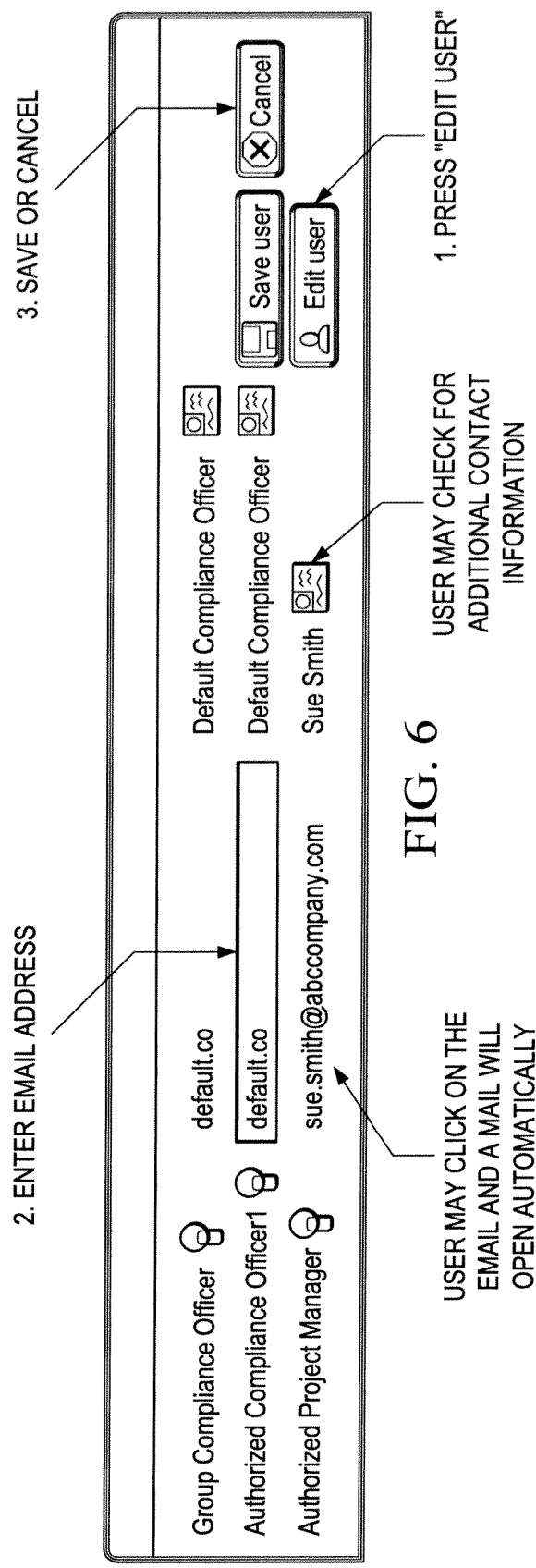
FIG. 6 illustrates an example interface generated by the limit of authority tool displaying automatically selected authorized users and allowing the user to enter and/or edit authorized approvers, according to certain embodiments.

FIG. 6 illustrates an example partial screen view generated by tool 18 allowing the user to enter and/or edit one or more of a group compliance officer (or regional compliance officer), another authorized compliance officer, and an authorized project manager. In some embodiments, tool 18 automatically selects one or more authorized approvers based on data available to tool 108 regarding the project.

For example, in the embodiment shown in FIG. 6, tool 18 automatically assign the user who initially opened the project in tool 18 as the default project manager. Tool 18 may also automatically determine one or more default compliance officers based on specific project key data entered at step 106. For example, the user may enter a code that identifies an organizational unit in ABC Company, and tool 18 may access a database to identify one or more compliance officers corresponding to that organizational unit. Tool 18 may then cross-check the identified compliance officer(s) in another database (e.g., to confirm that such person(s) are still employed at ABC Company), and then assign such person(s) as default compliance officer(s).

Tool 18 may also allow the user to specify one or more additional authorized compliance officers, and/or to edit the assigned project manager and/or compliance officer(s). Tool 18 may allow the user to specify particular employees by entering/selecting the employee's name, email address, employee ID, etc. In some embodiments, only authorized approvers have full read and write access to view and add/edit authorized approvers, while non-authorized approvers only have read access to view authorized approvers. In other embodiments, all employees have full read and write access to view and add/edit authorized approvers until a predetermined stage in the project decision timeline, after which only authorized approvers have full read and write access to view and add/edit authorized approvers.

Tool 18 may then guide the user through a project categorization analysis at steps 110-112. At step 110, tool 18 presents the user with a project categorization questionnaire to obtain information regarding the size, complexity, and overall risk associated with the project. FIGS. 7A and 7B illustrate an example project categorization questionnaire according to one embodiment. The example questionnaire includes a number of questions/classifications in the left hand column broken into four categories: Financial, Contractual, Technical Complexity, and Organization Considerations. Each question has a range of five possible responses, indicated as Level 1 to Level 5. Each response has an associated point value. The five responses generally range from smallest/least complex (Level 1) to largest/most complex (Level 5), with an increasing point value from smallest/least complex to largest/most complex. The user selects a response for each question, and tool 18 calculates the point total for the user's answers.

As an example, with reference to FIGS. 7A and 7B, the first listed question asks the user for the "Order Value" of the project. The user can the appropriate response from the five possible responses (Level 1 through Level 5) by clicking on the check box for that response. For instance, if the order value for the project is 200 million Euro, the user clicks on the check box under the Level 4 response, which has a corresponding point value of 100. When the user clicks the box, the "Value" indicator in the right-hand column may be updated to indicate 100.

At step 112, after the user completes the questionnaire, tool 18 automatically selects a project categorization (A-F) based on the calculated point total. Each project categorization (A-F) may have a corresponding range of point totals. For example, the following point total ranges may be used for assigning the project categorization (A-F):

Category A=greater than 1000 points,
Category B=500 to 1000 points,
Category C=60 to 500 points,
Category D=40 to 59 points,
Category E=20 to 39 points, and
Category F=0 to 19 points.

The calculated project categorization (A-F) is used as an input for determining the escalation level, as discussed below at step 128.

Figure 8:
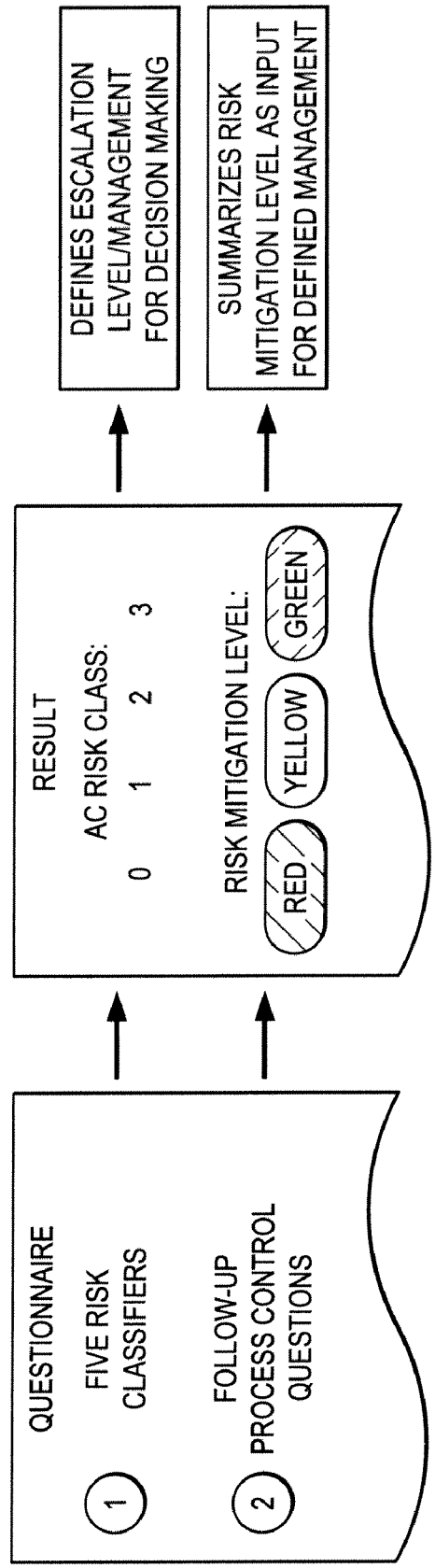
FIG. 8 illustrates an example process flow summary for an anti-corruption risk class analysis and an anti-corruption risk mitigation level analysis, according to certain embodiments.

Tool 18 may then guide the user through an anti-corruption (AC) risk classification analysis at steps 114-118, and the AC risk mitigation level analysis at steps 120-124. FIG. 8 illustrates an example process flow summary for these analyses, according to on embodiment. In that embodiment, a five question questionnaire is used to determine an AC Risk Class of 0 (highest risk), 1, 2, or 3 (lowest risk), and one or more follow-up process control questions are then used to determine a risk mitigation level using a stoplight indicator of red (compliance violation), yellow (warning), or green (fully compliant).

Turning first to the AC risk classification analysis, at step 114, tool 18 determines a set of questions to present to the user based at least on (a) the project key data entered by the user at step 106 and/or (b) the project category determined at steps 110-112. Tool 18 may maintain a master set of questions 28, and apply a set of rules to select particular questions from the master set to present to the user. For example, tool 18 may select the questions to present to the user based on any one or more of the following input: (a) the dollar/Euro/etc amount of the project (entered by the user at step 106), (b) whether or not any business partners are involved (entered by the user at step 106), (c) the project categorization (A-F) determined at steps 110-112, and/or any other data entered by the user or otherwise obtained by tool 18. Further, in some embodiments, tool 18 may skip the AC risk class analysis based on such input. FIG. 9 illustrates one example embodiment in which tool 18 may skip the AC risk class analysis (or make the analysis optional) where (a) the project categorization is C, D, E, or F, and (b) there are no business partners involved (i.e., conditions indicating a relatively low risk level); if either of these two conditions is not met, the AC risk class analysis is required.

At step 116, tool 18 presents the selected AC risk classification questions to the user. FIG. 10 illustrates an example set of five AC risk classifier questions selected for and presented to the user. In this example, each response includes a check-box selection and a field for typing in additional notes. The check-box selections are used by tool 18 for calculating the AC risk class, and any typed notes may be included in a report later generated by reporting engine 24, which may be presented to the ultimate decision making authority.

At step 118, tool 18 applies a set of rules to automatically calculate an AC risk class of 0 (highest risk), 1, 2, or 3 (lowest risk) based on the user's responses to the AC risk questions. The calculated AC risk class is used as an input for determining the escalation level, as discussed below at step 128.

Turning next to the AC risk mitigation level analysis, at step 120, tool 18 determines a set of follow-up "process control" questions to present to the user based at least on (a) the user's responses to the AC risk class questionnaire at step 116 and/or (b) the project category determined at steps 110-112. Tool 18 may apply a set of rules to select particular questions from the master set of questions 28 to present to the user.

At step 122, tool 18 presents the selected AC risk mitigation level questions to the user. FIGS. 11 and 12 illustrate example AC risk mitigation level questions selected for and presented to the user, according to one embodiment. In this example, FIG. 11 illustrates example Business Partner Risk process control questions, and FIG. 12 illustrates example Customer Risk process control questions that are presented where (a) the project category is A, B, or C and (b) one or more business partners are involved in the project.

In this example, each response generally includes a check-box selection of three choices: green, yellow, and red; as well as a field for typing in references to supporting documentation for any yellow or green response. In general, "red" responses indicate that the relevant risk analysis action has not been performed, "yellow" responses indicate that the relevant risk analysis action has been performed but not according to predefined standards, and "green" responses indicate that the relevant risk analysis action has been performed according to predefined standards. Depending on the embodiment, the user's responses may or may not be used by tool 18 as input for determining the escalation level at step 128. In certain embodiments, the check-box selections (red/yellow/green) and supporting references are included in a report later generated by reporting engine 24, which may be presented to the ultimate decision making authority.

Further, at step 124, tool 18 may apply a set of rules to automatically calculate an AC risk mitigation level summary of red, yellow, or green based on the user's responses to the AC risk mitigation level questions. This AC risk mitigation level summary may or may not be used by tool 18 as input for determining the escalation level at step 128. In certain embodiments, the AC risk mitigation level summary is included in a report later generated by reporting engine 24, which may be presented to the ultimate decision making authority.

Next, at step 126, tool 18 prompts the user to enter a business group-specific risk class of 0 (highest risk), 1, 2, or 3 (lowest risk),. This risk class may be determined by a business group relevant to the project, and may define the project's business risk specific to that business group. The risk class may be determined separate from tool 18 (e.g., in a business group meeting), according to any suitable categorization rules.

Figure 13:
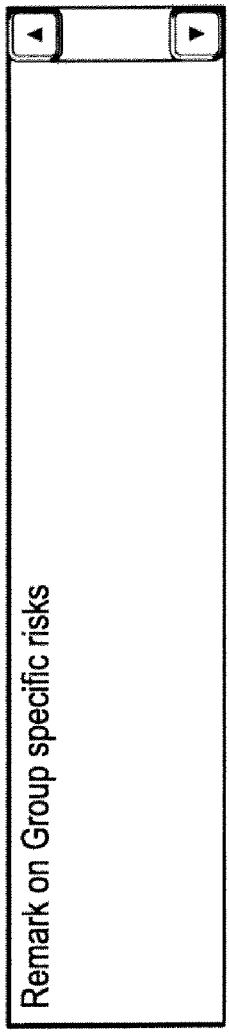
FIG. 13 illustrates an example interface provided by the limit of authority tool for allowing the user to enter a group-specific risk classification, according to certain embodiments.

FIG. 13 illustrates an example interface provided by tool 18 allowing the user to enter the group-specific risk class. As shown, the interface may include a field for selecting the group-specific risk class, a field for providing a link to any documents associated with the group-specific risk class determination (in this example, the business group is "Power Transmission and Distribution (PTD)), and a field for entering comments regarding the group-specific risks. The group-specific risk class (0, 1, 2, or 3) is used as an input for determining the escalation level, as discussed below at step 128.

Next, at step 126, tool 18 determines the limit of authority escalation level for the project, by applying algorithms (e.g., a decision matrix) to the inputs determined above: (a) the project categorization (A-F), (b) the AC risk class (0-3), and (c) the group-specific risk class (0-3). As discussed above, the limit of authority escalation level identifies the decision making authority level in ABC Company to which the project must be sent for approval to proceed. In general, the higher the classifications (with A, 0, and 0 being the highest classification for the three inputs, respectively), the higher the resulting escalation level. In some embodiments, the highest of the three classifications significantly dictates the resulting escalation level.

Figure 14:
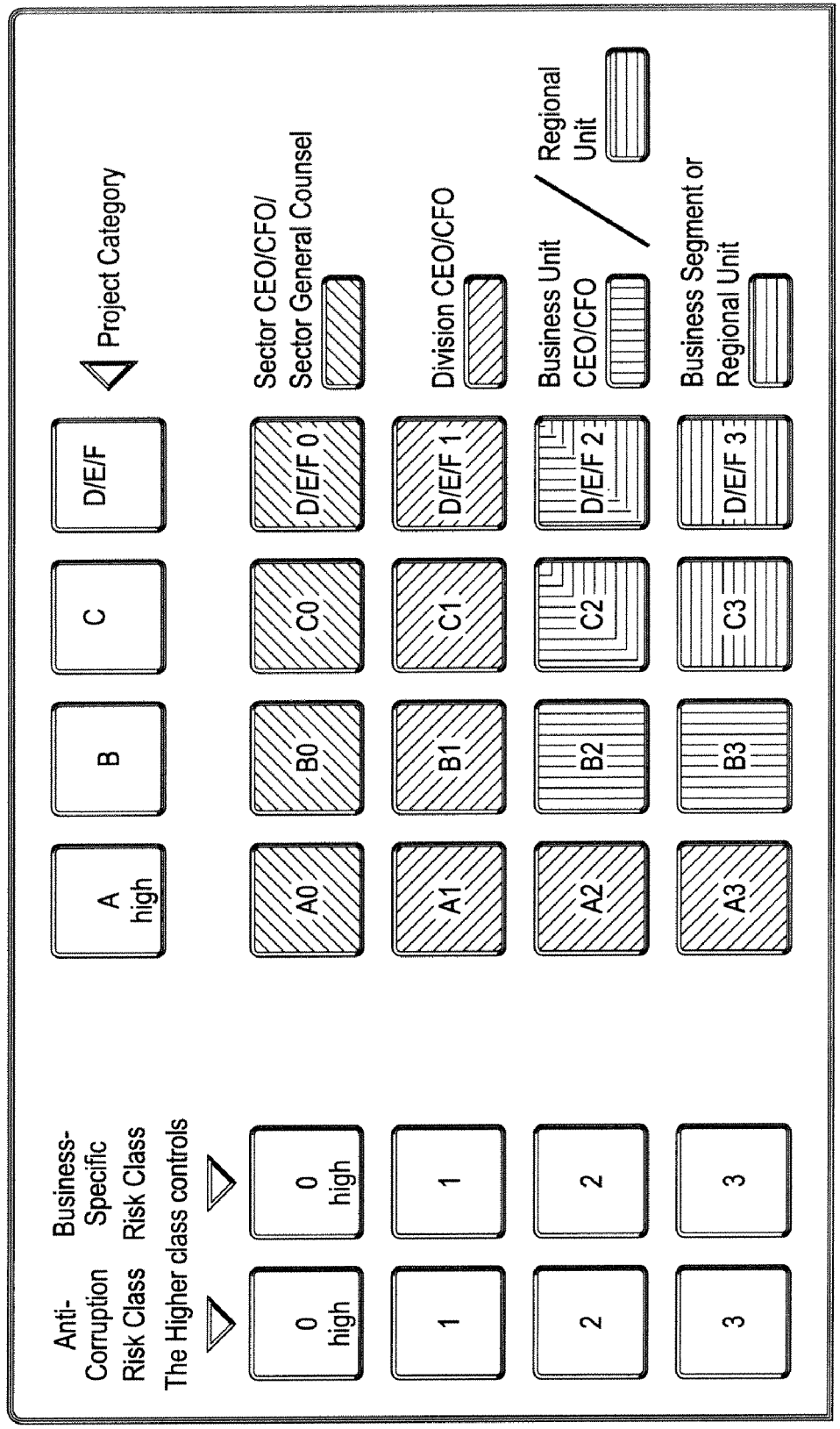
FIG. 14 illustrates an example decision matrix for determining an escalation level for a project, according to certain embodiments.

FIG. 14 illustrates an example decision matrix for determining the escalation level based on the inputs: (a) project categorization, (b) AC risk class, and (c) business group-specific risk class. The project categories are arranged across the top of the matrix, and the AC risk class and business group-specific risk class are arranged along the left side of the matrix. The possible escalation levels (i.e., decision making authority levels) are listed on the right side of the matrix, each having a unique color/shading. The 4×4 matrix in the middle indicates the escalation level for specific combinations of inputs. Specifically, the color/shading of each square indicates the resulting escalation level for a specific combination of inputs. In this example, the higher of the AC risk class and business group-specific risk class controls for selecting the proper row of the matrix. For example, suppose an AC risk class of 0 and a business group-specific risk class of 3. The higher class—here, the AC risk class of 0—controls, such that the 0 row of the matrix is used. As another example, suppose an AC risk class of 3 and a business group-specific risk class of 2. The higher class—business group-specific risk class of 2—controls, such that the 1 row of the matrix is used.

As shown in the example of FIG. 14, the highest of the three classifications significantly dictates the resulting escalation level. Input combinations that yield results of A0, B0, C0, or D/E/F 0 result in the high escalation level: "Sector CEO/CFO/Sector General Counsel." Input combinations that yield results of A1, A2, A3, B1, C1, or D/E/F 1 result in the next highest escalation level: "Division CEO/CFO." Input combinations that yield results of B2 or B3 result in the next highest escalation level: "Business Unit CEO/CFO." Input combinations that yield results of C2 or D/E/F 2 result in the next highest escalation level: "Business Unit CEO/CFO/Regional Unit." Finally, input combinations that yield results of C3 or D/E/F 3 result in the lowest escalation level: "Business Segment or Regional Unit."

At step 130, reporting engine 24 of tool 18 generates various summaries and reports of the results of the analysis. FIGS. 15-17 illustrate examples of such summaries and reports, according to one embodiment. FIG. 15 illustrates an example summary generated by reporting engine 24, indicating each of the three categorizations/classifications, and the resulting escalation level. The summary also indicates the completion status of each of the three categorizations/classifications, a "sign off" button, and a link to an automatically generated Summary Report (see FIG. 16 below). The completion status for each categorization/classification may indicate whether the user clicked a "mark complete" or other button after completing that categorization/classification. In some embodiments, the user is not allowed to sign off on the results unless all three categorizations/classifications are indicated as completed. In some embodiments, only the project manager (as identified at step 108) can sign off on the results. In other embodiments, either the project manager or an authorized compliance officer (as identified at step 108) can sign off on the results.

FIG. 16 illustrates an example of the automatically generated Summary Report generated by reporting engine 24, as mentioned above. The Summary Report may be stored as any suitable type of file, e.g., a .pdf file, WORD file, or POWERPOINT file. The Summary Report provides a summary of the project analysis performed by tool 18, which can be delivered to the appropriate decision making authority level determined at step 128. The Summary Report may include general project information, an overview of sales partners and their provisions, the categorizations/risk classes and resulting escalation level, the identity of the person who signed off on the analysis, and an anti-corruption risk assessment summary for various parties or aspects relevant to the project (e.g., customer, business consultants, joint ventures, consortium, sales agent, and distributor).

FIG. 17 illustrates an example Process Control Report automatically generated by reporting engine 24. The Process Control Report may be automatically generated based on the AC risk mitigation level analysis performed at steps 120-124.

This process control report may provide a detailed accounting for each "yellow" and "red" response provided by the user at step 122. For each item, the report may list the control exception (i.e., the reason for the yellow or red response), the implication of such control exception, and space for adding recommendations (e.g., written notes) of a compliance officer. The Process Control Report may be delivered along with the Summary Report to the appropriate decision making authority level determined at step 128.

FIG. 18 illustrates an example history log for the project maintained by tool 18, according to one embodiment. The history log may indicate the history of the project analysis, and details regarding the sign off of the results.

It will be appreciated that systems, methods, and techniques disclosed herein may be similarly applied in other contexts. Additionally, it should be understood that various changes, substitutions and alterations can be made herein without departing from the spirit and scope of the disclosure as illustrated by the following claims.

What is claimed is:

1. A computer-facilitated method for analyzing projects in a business entity including multiple groups and multiple levels of decision making authority, comprising:

receiving by a processor project identification data that identifies a particular project;

performing a project categorization of the project to categorize the project based on one or more of the size, general risks, and complexity of the project, including the processor:

presenting a set of questions regarding one or more of the size, general risks, and complexity of the project to a user;

receiving responses to the set of questions regarding the size, general risks, and complexity of the project from the user; and automatically determining a project categorization of the project based at least on the received responses to the set of questions;

the processor automatically determining whether a computer-facilitated anti-corruption risk assessment is required based on the project categorization determined from the received user input regarding one or more of the size, general risks, and complexity of the project;

only if it is determined that the computer-facilitated anti-corruption risk assessment is required based on the project categorization determined from the received user input, the processor performing an anti-corruption risk assessment of the project to categorize an anti-corruption risk associated with the project, including the processor automatically determining the anti-corruption risk based at least on project categorization determined from the received user input;

performing a group-specific risk assessment of the project to determine from a plurality of risk classes a risk class specific to a particular one of the multiple groups of the business entity based on the risk associated with the project relevant to the particular group of the business entity; and the processor accessing an escalation level algorithm and automatically applying the escalation level algorithm to (a) the project categorization determined from the received user input regarding one or more of the size, general risks, and complexity of the project, (b) the anti-corruption risk assessment, if performed, and (c) the group-specific risk assessment to automatically determine a limit of authority escalation level, wherein the limit of authority escalation level indicates a particular level of decision making authority of the business entity required to approve the project.

2. A method according to claim 1, further comprising: automatically determining one or more authorized approvers based at least on the received project identification data; and requiring an authorized approver to electronically sign off on the results of the project categorization, the anti-corruption risk assessment, and the group-specific risk assessment.

3. A method according to claim 1, wherein performing an anti-corruption risk assessment of the project includes:

receiving data indicating whether the project includes any business partners;

automatically determining one or more parameters of an anti-corruption risk assessment based at least on (a) whether the project includes at least one business partner and (b) the project categorization of the project.

4. A method according to claim 1, wherein performing an anti-corruption risk assessment of the project includes:

automatically determining a set of anti-corruption risk assessment questions based at least on data received during the project categorization;

presenting the anti-corruption risk assessment questions to a user;

receiving responses to the anti-corruption risk assessment questions from the user; and automatically determining an anti-corruption risk class based at least on the received responses.

5. A method according to claim 4, wherein performing an anti-corruption risk assessment of the project further includes:

automatically determining one or more follow-up questions based at least on the received responses to the anti-corruption risk assessment questions;

presenting the follow-up questions to a user;

receiving responses to the follow-up questions from the user; and automatically determining an anti-corruption risk mitigation level based at least on the received responses to the follow-up questions.

6. A method according to claim 1, wherein:

performing the project categorization of the project includes determining a project category;

performing the anti-corruption risk assessment of the project includes determining an anti-corruption risk class;

performing the group-specific risk assessment of the project includes determining a group-specific risk class; and automatically determining the limit of authority escalation level includes:

automatically applying the escalation level algorithm to the project category, the anti-corruption risk class, and the group-specific risk class to determine the escalation level for the project.

7. A method according to claim 6, wherein the escalation level algorithm comprises a decision matrix.

8. A method according to claim 6, wherein applying the escalation level algorithm includes:

determining the higher of the anti-corruption risk class and the group-specific risk class; and using (a) the higher of the anti-corruption risk class and the group-specific risk class, and (b) the project category as inputs to the escalation level algorithm.

9. A method according to claim 6, further comprising automatically generating a report indicating the project category, the anti-corruption risk class, the group-specific risk class, and the determined escalation level for the project.

10. Logic instructions stored in non-transitory computer-readable media and executable by a processor for analyzing projects in a business entity including multiple groups and multiple levels of decision making authority, including logic instructions for:
   receiving from a user project identification data that identifies a particular project;
   facilitating a project categorization of the project to categorize the project based on user input regarding one or more of the size, general risks, and complexity of the project; including:
      presenting a set of questions regarding one or more of the size, general risks, and complexity of the project to the user;
      receiving responses to the set of questions regarding one or more of the size, general risks, and complexity of the project from the user; and
      automatically determining a project categorization of the project based at least on the received responses to the set of questions;
   automatically determining whether a computer-facilitated anti-corruption risk assessment is required based on the project categorization determined from the received user input regarding one or more of the size, general risks, and complexity of the project;
   only if it is determined that the computer-facilitated anti-corruption risk assessment is required based on the project categorization determined from the received user input, facilitating an anti-corruption risk assessment of the project to categorize an anti-corruption risk associated with the project;
   receiving a group-specific risk classification selected from multiple classifications, the group-specific risk classification indicating a risk associated with the project relevant to one of the multiple groups of the business entity; and
   accessing an escalation level algorithm and automatically applying the escalation level algorithm to (a) the project categorization determined from the received user input regarding one or more of the size, general risks, and complexity of the project, (b) the anti-corruption risk assessment, if performed, and (c) the group-specific risk assessment to automatically determine a limit of authority escalation level, wherein the limit of authority escalation level indicates a particular level of decision making authority of the business entity required to approve the project.

11. Logic instructions according to claim 10, further including logic instructions for:
   automatically determining one or more authorized approvers based at least on the received project identification data; and
   requiring an authorized approver to electronically sign off on the results of the project categorization, the anti-corruption risk assessment, and the group-specific risk assessment.

12. Logic instructions according to claim 10, wherein performing an anti-corruption risk assessment of the project includes:
   receiving data from the user indicating whether the project includes any business partners;
   automatically determining one or more parameters of an anti-corruption risk assessment based at least on (a) whether the project includes at least one business partner and (b) the project categorization of the project.

13. Logic instructions according to claim 11, wherein performing an anti-corruption risk assessment of the project includes:
   automatically determining a set of anti-corruption risk assessment questions based at least on data received during the project categorization;
   presenting the anti-corruption risk assessment questions to the user;
   receiving responses to the anti-corruption risk assessment questions from the user; and
   automatically determining an anti-corruption risk class based at least on the received responses.

14. Logic instructions according to claim 13, wherein performing an anti-corruption risk assessment of the project further includes:
   automatically determining one or more follow-up questions based at least on the received responses to the anti-corruption risk assessment questions;
   presenting the follow-up questions to the user;
   receiving responses to the follow-up questions from the user; and
   automatically determining an anti-corruption risk mitigation level based at least on the received responses to the follow-up questions.

15. Logic instructions according to claim 10, wherein:
   performing the project categorization of the project includes determining a product category;
   performing the anti-corruption risk assessment of the project includes determining an anti-corruption risk class;
   performing the group-specific risk assessment of the project includes receiving from the user a group-specific risk class; and
   automatically determining the limit of authority escalation level includes:
      automatically applying the escalation level algorithm to project category, the anti-corruption risk class, and the group-specific risk class to determine the escalation level for the project.

16. Logic instructions according to claim 15, wherein the escalation level algorithm comprises a decision matrix.

17. Logic instructions according to claim 15, wherein applying the escalation level algorithm includes:
   determining the higher of the anti-corruption risk class and the group-specific risk class; and
   using (a) the higher of the anti-corruption risk class and the group-specific risk class, and (b) the project category as inputs to the escalation level algorithm.

* * * * *